(12) United States Patent
Bosch

(10) Patent No.: US 11,331,945 B2
(45) Date of Patent: May 17, 2022

(54) WHEEL CARRIER ASSEMBLY FOR A MOTOR VEHICLE

(71) Applicant: AUDI AG, Ingolstadt (DE)

(72) Inventor: Jakob Bosch, Bad Waldsee (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/044,958

(22) PCT Filed: Mar. 20, 2019

(86) PCT No.: PCT/EP2019/056991
§ 371 (c)(1),
(2) Date: Oct. 2, 2020

(87) PCT Pub. No.: WO2019/201540
PCT Pub. Date: Oct. 24, 2019

(65) Prior Publication Data
US 2021/0138833 A1    May 13, 2021

(30) Foreign Application Priority Data
Apr. 17, 2018  (DE) .................... 10 2018 205 793.1

(51) Int. Cl.
*B60B 27/00* (2006.01)
*F16D 65/847* (2006.01)
*B62D 7/18* (2006.01)

(52) U.S. Cl.
CPC ............ *B60B 27/0052* (2013.01); *B62D 7/18* (2013.01); *F16D 65/847* (2013.01)

(58) Field of Classification Search
CPC ..... B60B 27/0052; B62D 7/18; F16D 65/847; B60T 5/00
See application file for complete search history.

(56) References Cited

U.S. PATENT DOCUMENTS

| 4,901,826 A | * | 2/1990 | Preiss | ....................... B60T 5/00 188/264 A |
| 5,002,160 A | * | 3/1991 | Weiler | ................... F16D 55/228 188/264 AA |
| 6,357,562 B1 | | 3/2002 | Toman et al. | |

(Continued)

FOREIGN PATENT DOCUMENTS

| CN | 105745468 A | 7/2016 |
| DE | 3803801 A1 | 8/1989 |

(Continued)

OTHER PUBLICATIONS

German Search Report dated Mar. 26, 2021, in connection with corresponding DE Application No. 10 2018 205 793.1 (19 pp., including machine-generated English translation).

(Continued)

*Primary Examiner* — Darlene P Condra
(74) *Attorney, Agent, or Firm* — Maier & Maier, PLLC

(57) ABSTRACT

A wheel carrier assembly for a motor vehicle including a wheel carrier, which has a main body and a knuckle arm extending from the main body for connecting a tie rod by means of a tie rod joint, and a brake disc, which is mounted on the wheel carrier by a wheel bearing. An air-guiding element is fastened to the main body via the knuckle arm, having a ventilation channel for ventilation of the brake disk, which is directed towards the brake disk.

9 Claims, 2 Drawing Sheets

(56) References Cited

U.S. PATENT DOCUMENTS

| 2006/0191754 | A1 | 8/2006 | Toman |
| 2009/0001678 | A1 | 1/2009 | Sumey et al. |
| 2009/0265880 | A1* | 10/2009 | Jessberger ............... B60T 5/00 15/347 |
| 2017/0009835 | A1* | 1/2017 | Booker ................. F16D 69/023 |
| 2020/0217378 | A1* | 7/2020 | Zhang .................. F16D 65/847 |

FOREIGN PATENT DOCUMENTS

| DE | 10 2013 012 273 A1 | 1/2015 |
| DE | 10 2013 223 668 A1 | 5/2015 |
| FR | 3 039 811 A1 | 2/2017 |
| GB | 2520239 A | 5/2015 |
| WO | 2016/051102 A1 | 4/2016 |

OTHER PUBLICATIONS

Notification of Transmittal of Translation of the International Preliminary Report on Patentability dated Oct. 29, 2020, in connection with corresponding international application No. PCT/EP2019/056991 (9 pages).

International Search Report dated Jun. 6, 2019 in corresponding International application No. PCT/EP2019/056991; 6 pages.

Written Opinion of the International Searching Authority dated Jun. 6, 2019 in corresponding International application No. PCT/EP2019/056991; 12 pages including Machine-generated English-language translation.

Office Action dated Jan. 6, 2022 in corresponding Chinese Application No. 201980025748.8; 11 pages including English-language translation.

* cited by examiner

WHEEL CARRIER ASSEMBLY FOR A MOTOR VEHICLE

FIELD

The disclosure relates to a wheel carrier assembly for a motor vehicle, comprising a wheel carrier, which has a main body and a knuckle arm extending from the main body for connecting a tie rod by means of a tie rod joint, and comprising a brake disc, which is mounted on the wheel carrier by means of a wheel bearing.

BACKGROUND

For example, the publication DE 10 2013 223 668 A1 is known from the prior art. This disclosure relates to a cooling air guide for a friction lining brake of a motor vehicle having a wheel carrier and a wheel hub connected to the wheel carrier, wherein the friction lining brake has a brake body with friction surfaces connected to the wheel hub of the motor vehicle and a brake cover disposed on the inside of the brake body and fixedly attached to the wheel carrier. The brake cover forms a first air-guiding device of the cooling air guide. The cooling air guide has a second air-guiding device which is disposed on a side of the brake cover facing away from the brake body and is fixedly attached to the brake cover.

The second air-guiding device is formed in such a way that cooling air flowing in from the front, relative to a vehicle longitudinal direction, is guided through the second air-guiding device towards the vehicle exterior to the first air-guiding device and from there through cooperation of the first air-guiding device and the second air-guiding device further towards the vehicle exterior to the brake body. For this purpose, the second air-guiding device can have a scoop-shaped primary air-guiding surface extending in the transverse vehicle direction up to the close proximity of the brake cover.

SUMMARY

It is an object of the invention to propose a wheel carrier assembly for a motor vehicle which has advantages over known wheel carrier assemblies, in particular, which achieves reliable cooling of the brake disk while providing low weight.

According to the invention, this object is achieved with a wheel carrier assembly for a motor vehicle. It is provided that an air-guiding element is fastened to the main body via the knuckle arm having a ventilation channel for ventilation of the brake disk which is directed towards the brake disk.

The wheel bearing assembly is used to rotatably mount at least one wheel on a body of the motor vehicle. Preferably, the wheel bearing assembly is part of a wheel suspension, which is used for the suspension, in particular the resilient suspension, of the wheel with respect to the body. The wheel is rotatably mounted on the wheel carrier of the wheel bearing assembly. To this end, the wheel can be fastened to a wheel hub of the wheel carrier assembly, the wheel hub ultimately being rotatably mounted on the wheel carrier, for example by means of the wheel bearing. The wheel hub can be part of the wheel bearing or can be integrally formed therewith. For example, the wheel hub is configured integral with or of uniform material with an inner ring or an outer ring of the wheel bearing, whereas the respective other ring, i. e. the outer ring or the inner ring, is attached to the wheel carrier.

The wheel carrier has, for example, a wheel bearing socket which can be configured as an opening, in particular as a closed-edged opening, in the wheel carrier. The wheel bearing is partly disposed in the wheel bearing socket. In addition, the wheel hub and/or a shaft connected to it in a rotationally fixed manner at least partly engages the wheel bearing socket. More preferably, the wheel hub and/or the shaft, in particular jointly, penetrate the wheel bearing socket in the axial direction in relation to an axis of rotation of the wheel hub, at least partially, in particular entirely.

The wheel bearing is preferably configured as a rolling bearing and, as such, has an inner ring and an outer ring, between which rolling elements are disposed to reduce friction. The inner ring is associated with the wheel hub, in particular connected to the wheel hub, for example configured integral therewith or attached thereto, whereas the outer ring is associated with the wheel carrier, in particular connected to the wheel carrier, for example fastened to it. Preferably, the outer ring is located in the wheel bearing socket. In other words, the outer ring abuts with its outer peripheral surface on an inner peripheral surface of the wheel carrier that defines the wheel bearing socket.

Preferably, the wheel carrier is connected to the body via at least one suspension link. Thus, the suspension link engages the body on one side and the wheel carrier on the other side, in particular so as to be respectively pivotable. The suspension link is, for example, provided in the form of a transverse link. However, a configuration as a trailing link is also possible. In general, the wheel carrier is connected via the at least one suspension link. More preferably, a plurality of suspension links for connecting the wheel carrier to the body is provided, though. In particular, the suspension link is provided in the form of a two-point link.

The wheel carrier has at least the main body and the knuckle arm extending from the main body in the form of a protrusion. The main body and the knuckle arm are preferably configured integral with each other and/or of uniform material. The knuckle arm is used to hinge or connect the tie rod, via which a steering movement is transmitted to the wheel carrier. The tie rod engages the connection point at the knuckle arm, wherein the connection point is spaced apart from an axis of rotation of the wheel carrier about which the wheel carrier is rotatably supported with respect to the body. In this way, a lever stroke is generated, via which a linear movement of the tie rod is converted into a rotary movement of the wheel carrier.

The tie rod is pivotally hinged to the knuckle arm, namely via the tie rod joint. Relative to the knuckle arm, the tie rod joint is provided, for example, relative to an axis of rotation of the tie rod joint or an axis of rotation of the tie rod, next to the knuckle arm in the axial direction. In the installed position of the wheel carrier, the tie rod joint, and therefore the tie rod, are disposed above or below the knuckle arm. Preferably, the tie rod has a bearing element which engages a bearing housing which is fastened or can be fastened to the tie rod to form the tie rod joint.

The tie rod joint or the bearing housing is fastened by means of a bolt which, for this purpose, at least partially penetrates a recess formed in the knuckle arm. For example, the tie rod joint or the bearing housing is provided, in the axial direction relative to the axis of rotation of the tie rod joint, on one side of the knuckle arm and a nut for fastening the tie rod joint to the knuckle arm is provided on the other side of the knuckle arm. In this respect, the bolt entirely penetrates the knuckle arm in the axial direction. On one side of the knuckle arm, the tie rod joint is fastened or can be fastened to the knuckle arm at the connection point. It should be understood that the tie rod joint is disposed next to the knuckle arm, in the axial direction relative to a longitudinal centre axis of the bolt, for example, abutting on the knuckle arm or spaced apart therefrom in the axial direction.

The brake disk is rotatably mounted on the wheel carrier, namely by means of the wheel bearing. Preferably, the brake disk is rigidly or non-rotatably connected to the wheel hub and is mounted together therewith on the wheel carrier by means of the wheel bearing. The brake disk is part of a braking device and is used to decelerate the motor vehicle.

For this purpose, the brake disk interacts with a brake pad which can be pressed to the brake disk to cause a braking force. The interaction between the brake disk and the brake pad generates heat due to the friction, which can cause an increase in temperature in the brake disk.

The air-guiding element is provided to counteract this increase in temperature and thereby ensure lasting and reliable operation of the braking device. By means of the air-guiding element, an air flow is guided or deflected towards the brake disk, such that the air flow is used for ventilation and ultimately for temperature control, in particular cooling, of the brake disk. The air flow is caused, for example, by the motor vehicle being driven, that is, it is an air flow induced by a driving speed of the motor vehicle.

According to the invention, the air-guiding element is fastened to the main body via the knuckle arm, so as to provide an overall space-saving arrangement of the air-guiding element on the one hand and high efficiency of the air-guiding element on the other hand. Since the knuckle arm is preferably located at the front, in the direction of travel of the motor vehicle, the knuckle arm protrudes beyond the main body against the direction of travel. In other words, the knuckle arm is located in front of the main body in the direction of travel. This means that the air flow, in particular the vehicle speed-induced air flow, hits the air-guiding element very early on. In this way, any influence of further areas of the wheel carrier assembly, for example the main body, on the air flow is avoided.

Thus, a large part of the air flow is guided towards the brake disk by means of the air-guiding element. For this purpose, the air-guiding element has or (partly) forms the ventilation channel. This means that the ventilation channel does not have to be completely encompassed by the air-guiding element, but rather that it can only be partially defined by the ventilation channel. For example, the air-guiding element defines the ventilation channel together with other elements of the wheel carrier assembly, such as the knuckle arm and/or the main body.

However, it can also be provided that the ventilation channel is completely enclosed by the air-guiding element. More preferably, the ventilation channel narrows in the direction of the brake disk such that the air flow is accelerated in the direction of the brake disk. In this way, a particularly effective temperature control or cooling of the brake disk is achieved. Preferably, the air-guiding element has an air inlet on the inlet side of the ventilation channel having an air inlet surface facing forward in the direction of travel. The air inlet is set up in such a way that the air flow induced by the vehicle speed hits the air inlet and is forced into the ventilation channel when the motor vehicle is moving. On the inlet side, the air-guiding element is formed in the manner of an air scoop such that the air inlet is a ram air inlet.

Thus, the described arrangement of the air-guiding element at the knuckle arm or its fastening to the main element via the knuckle arm enables, as explained hereinbefore, a particularly compact configuration of the wheel carrier assembly while providing at the same time a very high efficiency of the temperature control of the brake disk. Preferably, the air inlet is disposed on the inside relative to an axis of rotation of the wheel hub on the wheel carrier in the axial direction, whereas an air outlet through which the air flow exits the ventilation channel towards the brake disk is provided on the outside in the axial direction.

In other words, the air inlet is located on a side of the air-guiding element or the knuckle arm facing a vehicle longitudinal centre axis of the motor vehicle, whereas the air outlet is located on the side of the air-guiding element or the knuckle arm facing away from the vehicle longitudinal centre axis. Accordingly, the air flow is directed from a side of the wheel carrier facing away from the brake disk to a side of the wheel carrier facing the brake disk such that overall, a large amount of air is available for temperature control of the brake disk.

Another embodiment of the invention provides for the air-guiding element to be releasably fastened. This means that the air-guiding element is fastened to the knuckle arm without causing any damage and in a reversible manner, that is to say, it can be both fastened to and detached from the knuckle arm without causing any damage. This significantly simplifies assembly and, in particular, replacement of the air-guiding element.

Another preferred embodiment of the invention provides for the air-guiding element to extend from a bracket which is fastened to the knuckle arm on one side. Thus, the air-guiding element extends from the bracket, which in turn is fastened to the knuckle arm. In other words, the air-guiding element is only indirectly connected to the main body or the knuckle arm. It can be provided that the bracket is fastened to the main body and/or the knuckle arm on one side only or—preferably—on both sides. In the case of one-sided fastening, the bracket is preferably only fastened to the knuckle arm, whereas it is spaced apart from the main body. The bracket can be fastened by means of a screw fastening comprising one or more screws. The embodiment described enables particularly easy assembly and, in addition, excellent air guidance by means of the air-guiding element.

In a further preferred embodiment of the invention it can be provided that the bracket is fastened to the knuckle arm on one side and to the main body on the other side and that a closed-edged recess is formed in cross-section resulting from the two-sided fastening of the bracket which is defined by the main body, the knuckle arm, and the bracket together. Such a fastening of the bracket provides a particularly high rigidity of the bracket and the wheel carrier. The assembly described provides a large effective support surface for the wheel of the motor vehicle with little use of material, which provides a large lever arm for supporting the wheel as it extends in the same direction as the knuckle arm.

The two-sided fastening of the bracket engaging both the main body and the knuckle arm for this purpose achieves a high rigidity providing advantages in the event of an accident of the motor vehicle. For example, the bracket is configured in such a way that in the event of a frontal impact of the motor vehicle with an obstacle with a so-called "small overlap", the wheel of the motor vehicle is deflected or supported. Thus, the wheel cannot turn inwards.

A more preferred embodiment of the invention provides that the knuckle arm has a bearing eye for connecting the tie rod joint, wherein the bracket is fastened to the bearing eye on the side facing away from the main body. The bearing eye is formed by a thickening of the knuckle arm in at least one direction, in which a passage opening is formed for the bolt. Thus, the bearing eye completely surrounds the bolt in the peripheral direction after the tie rod joint has been mounted on the knuckle arm.

The bracket now engages the bearing eye on the side facing away from the main body. Accordingly, it is fastened directly to the bearing eye, for example by means of the screw connection mentioned hereinbefore. This means that the knuckle arm is used in an advantageous manner for spacing at least one area of the bracket apart from the main body of the wheel carrier. Thus, no separate protrusion is needed on the main body to connect the bracket. This enables a weight-reduced configuration of the wheel carrier.

A further development of the invention provides that the bracket has at least a first leg and a second leg extending at an angle from the first leg, wherein the air-guiding element abuts on the first leg and the second leg and/or is held in a clamping manner between the first leg and the main body. The bracket is generally configured in an essentially L-shaped form and has the first leg and the second leg for this purpose. The two legs extend directly from one another and are preferably configured integral with each other and/or of uniform material.

For example, the two legs, i. e. the first leg and the second leg, each merge into each other at one end. To this end, the two legs abut on each other at an angle which is greater than 0° and less than 180°. For example, the angle is at least 45° and at most 135°, at least 60° and at most 120°, at least 75° and at most 105°, at least 80° and at most 100°, at least 85° and at most 95° or approximately or exactly 90°. Such a configuration of the bracket is on the one hand easy to manufacture and on the other hand can be easily mounted on the main body or the knuckle arm.

It can be provided that the air-guiding element abuts both on the first leg and the second leg. This has the advantage that the bracket is at least partially covered by the air-guiding element, which provides excellent guidance of the air flow and prevents the bracket from affecting the air flow. Additionally or alternatively, the air-guiding element can abut on the first leg on one side and the main body on the other side, i. e. in particular it can be held between them in a clamping manner. This means that the air-guiding element is supported on the first leg on one side and on the main body on the other side and is therefore reliably held, i. e. in particular in the closed-edged recess.

Another embodiment of the invention provides that the air-guiding element has a fastening area which is held in a clamping manner between an end face of the bracket and the main body of the wheel carrier. For example, the fastening area rests flat against the end face of the bracket, in particular against an end face of the second leg, i. e. the side of the second leg facing the main body. Whereas, the fastening area abuts on the main body of the wheel carrier on the side facing away from the bracket. For example, the fastening area is penetrated by a fastening means via which the bracket is fastened to the main body, such as, for example, at least one screw. Such a configuration of the wheel carrier assembly provides a particularly reliable and durable fastening of the air-guiding element.

A more preferred further embodiment of the invention provides that the air-guiding element abuts on the first leg and/or the second leg on respective different sides. It can therefore be provided that the air-guiding element covers one of the legs or both legs (respectively) on several sides so as to minimize the effect of the legs or the bracket on the air flow. In this way, a particularly effective guidance of the air flow is achieved.

Another embodiment of the invention provides that the air-guiding element is pre-mounted on the bracket and can be mounted on the wheel carrier together with the bracket. For example, the air-guiding element is clipped to the bracket, that is to say held in a form-fitting manner on the bracket. The fastening of the air-guiding element to the bracket is preferably configured in such a way that it enables at least the joint mounting of the air-guiding element with the bracket on the wheel carrier. During assembly, it can be provided that the air-guiding element be fastened to the bracket and/or the wheel carrier, in particular its main body, in a different manner. For example, the fastening area of the air-guiding element is disposed and fastened between the end face of the bracket and the main body of the wheel carrier. The pre-mounted configuration of the air-guiding element provides particularly quick and easy assembly.

Finally, it can be provided in connection with a further embodiment of the invention that the air-guiding element consists of plastic or metal. This implements a robust and permanently reliable cooling of the brake disk.

BRIEF DESCRIPTION OF THE FIGURES

The invention is explained in more detail below with reference to the exemplary embodiments shown in the drawings, without limiting the invention. In the drawings.

DETAILED DESCRIPTION

Figure 1:
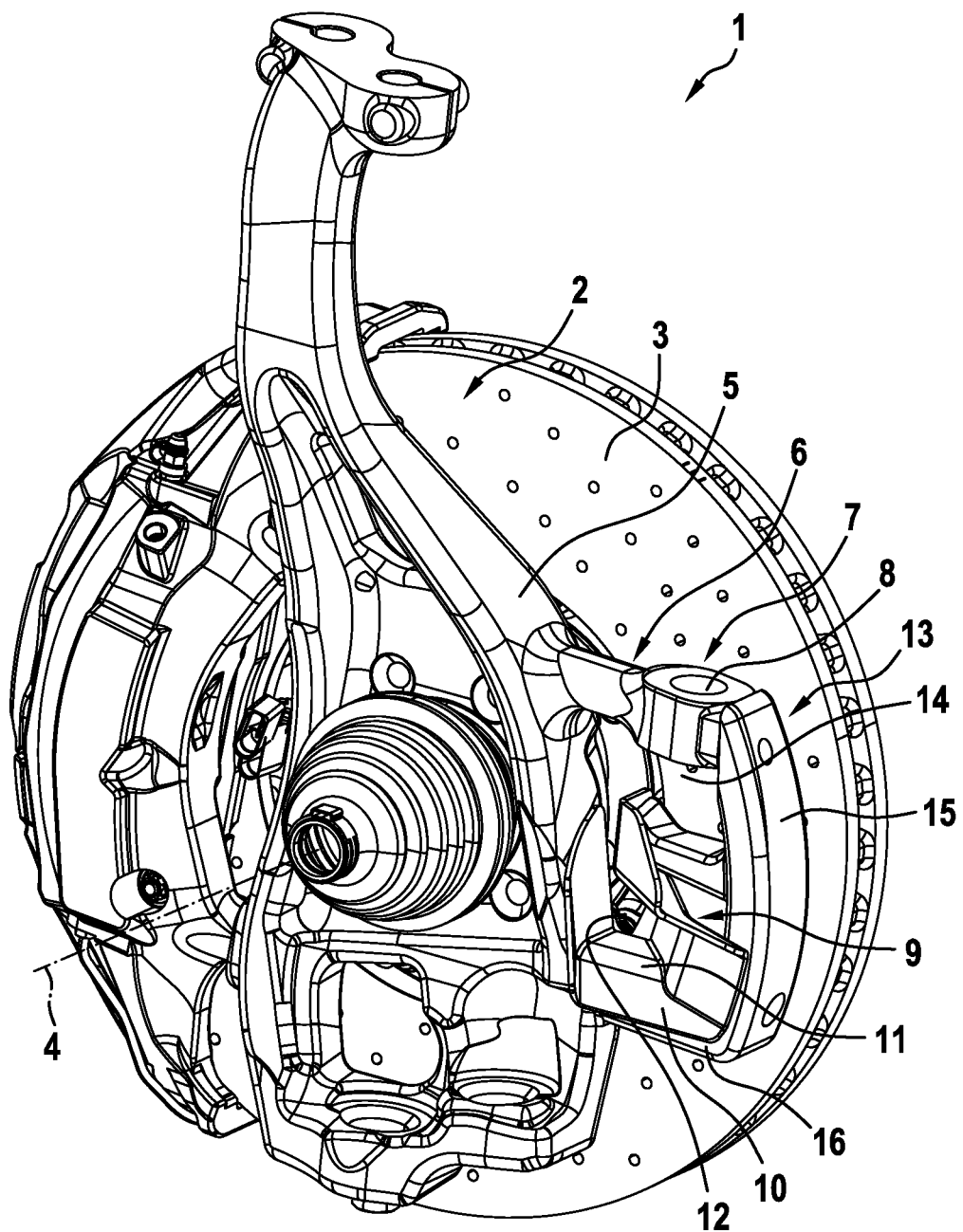
FIG. 1 shows a schematic representation of a wheel carrier assembly for a motor vehicle with an air-guiding element fastened via a knuckle arm for ventilating a brake disk.

FIG. 1 shows a schematic representation of a wheel carrier assembly 1 for a motor vehicle having a wheel carrier 2 and a brake disk 3. The brake disk 3 is rotatably mounted on the wheel carrier 2 by means of a wheel bearing (not shown), i. e. in relation to an axis of rotation 4. The wheel carrier 2 has a main body 5 in which a wheel bearing socket is formed for receiving the wheel bearing. Furthermore, the main body 5 is used for connecting a damper, a suspension and/or a strut of the motor vehicle. Preferably, the wheel carrier 2 is formed as a cast forged part.

A knuckle arm 6 extends from the main body 5 that is used for connecting a tie rod, which is part of a steering system. The tie rod is not shown here. To connect the tie rod to the knuckle arm 6 the knuckle arm 6 has a bearing eye 7 which is formed by a thickening of the knuckle arm 6 and has a recess 8. The recess 8 is provided and formed, for example, for disposing a fastening bolt of a tie rod joint, by means of which the tie rod is pivotably articulated on the knuckle arm 6. The recess 8 is preferably provided in the form of a borehole.

The knuckle arm 6 is provided in form of a protrusion extending from the main body 5 of the wheel carrier 2. In particular, the knuckle arm 6 extends against a forward direction of travel of the motor vehicle, that is, in the direction of a front of the motor vehicle. An air-guiding element 9 is fastened to the wheel carrier 2 or the main body 5 via the knuckle arm 6. The air-guiding element 9 is used to guide an air flow towards the brake disk 3. The air-guiding element 9 has an air inlet 10 through which the air flow enters a ventilation channel 11 and an air outlet 12 facing the brake disk 3 and serving as outlet for the air flow towards the brake disk 3.

According to the embodiment shown herein, the air inlet 10 is preferably disposed on the side of the knuckle arm 6 facing away from the brake disk 3, whereas the air outlet 12 is disposed on the side facing the brake disk 3. This means that the air-guiding element 9 receives the air flow from the side of the knuckle arm 6 facing away from the brake disk 3 and diverts it towards the brake disk 3. Preferably, the ventilation channel 11 has a cross-section tapering towards the brake disk 3 so as to accelerate the air flow in the direction of the brake disk 3 and effect a particularly effective temperature control or cooling of the brake disk 3.

The air-guiding element 9 extends from a bracket 13, which is preferably fastened to the knuckle arm 6 on one side and to the main body 5 on the other side. Thus, the bracket 13 forms a closed-edged recess 14 together with the main body 5 and the knuckle arm 6. The two-sided fastening of the bracket 13 provides a high degree of rigidity. This improves safety in the event of an accident involving the motor vehicle. Preferably, the bracket 13 is configured in such a way that in the event of a frontal impact of the motor vehicle with an obstacle with a small overlap, the wheel of the motor vehicle is deflected or supported. Thus, the wheel cannot turn inwards.

In the exemplary embodiment shown herein, the bracket 13 has a first leg 15 and a second leg 16. The second leg 16 extends from the first leg 15 and is angled in relation to the latter. The first leg 15 is fastened directly to the knuckle arm 6, i. e. to the bearing eye 7. However, the second leg 16 is fastened to the main body 5. It is now provided that the air-guiding element 9 abuts both the first leg 15 and the second leg 16. In addition, the air-guiding element 9 is held in a clamping manner between the first leg 15 and the main body 5.

Figure 2:
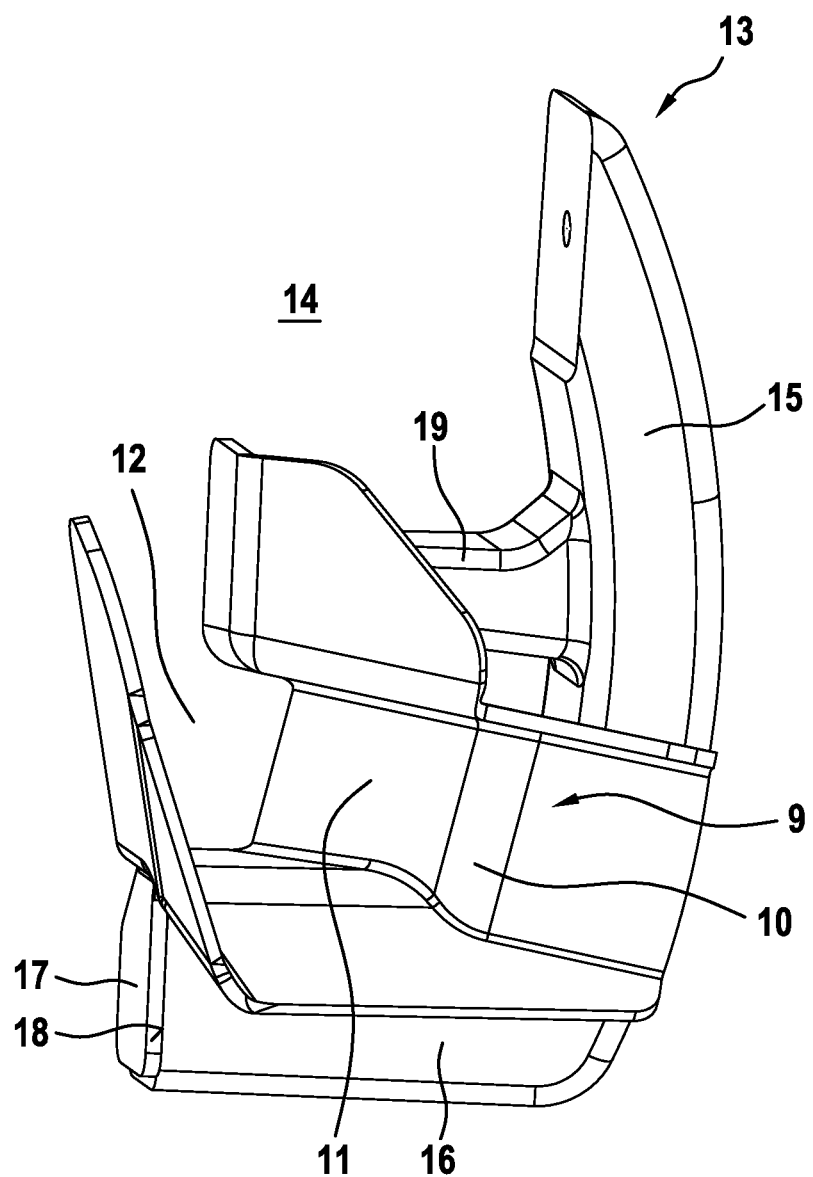
FIG. 2 shows a schematic representation of the air-guiding element and a bracket for fastening the air-guiding element.

FIG. 2 shows a schematic representation of the air-guiding element 9 and the bracket 13. The air-guiding element 9 is shown to have a fastening area 17 extending between an end face 18 of the bracket 13, i. e. the second leg 16, and the main body 5 (not shown herein). The fastening area 17 is held in a clamping manner between the end face 18 and the main body 5 as soon as the bracket 13 and the air-guiding element 9 are mounted on the wheel carrier 2. More preferably, the fastening area 17 is penetrated by a fastening means which is used to fasten the bracket 13 to the main body 5 after assembly.

A protrusion 19 extends from the first leg 15 and is spaced apart from the second leg 16 and is also spaced apart from the main body 5 after the bracket 13 has been mounted on the main body 5. In other words, the protrusion 19 only partially penetrates the recess 14 in the direction of the main body 5. The air-guiding element 9 abuts on one end face of the protrusion 19 and is thus supported on the protrusion 19. The protrusion 19 is, for example, part of a captive securing means for the tie rod.

The invention claimed is:

1. A wheel carrier assembly for a motor vehicle, comprising: a wheel carrier, which has a main body and a knuckle arm extending from the main body for connecting a tie rod by a tie rod joint, and having a brake disk, which is mounted on the wheel carrier by a wheel bearing, wherein an air-guiding element is fastened to the main body via the knuckle arm, which has a ventilation channel, which is directed toward the brake disk for the ventilation of the brake disk, wherein the air-guiding element extends from a bracket, which is fastened to the knuckle arm on one side.

2. The wheel carrier assembly according to claim 1, wherein the air-guiding element is releasably fastened.

3. The wheel carrier assembly according to claim 1, wherein the bracket is fastened to the knuckle arm on one side and to the main body on the other side, and that a closed-edged recess is formed in cross-section resulting from the two-sided fastening of the bracket, which is defined by the main body, the knuckle arm and the bracket together.

4. The wheel carrier assembly according to claim 1, wherein the knuckle arm has a bearing eye for connecting the tie rod joint, wherein the bracket is fastened to the bearing eye on the side facing away from the main body.

5. The wheel carrier assembly according to claim 1, wherein the bracket has at least one first leg and a second leg extending at an angle from the first leg, wherein the air-guiding element abuts on the first leg and the second leg and/or is held in a clamping manner between the first leg and the main body.

6. The wheel carrier assembly according to claim 5, wherein the air-guiding element abuts the first leg and/or the second leg on different sides, respectively.

7. The wheel carrier assembly according to claim 1, wherein the air-guiding element has a fastening area, which is held in a clamping manner between an end face of the bracket and the main body of the wheel carrier.

8. The wheel carrier assembly according to claim 1, wherein the air-guiding element is pre-mounted on the bracket and can be mounted together with the bracket on the wheel carrier.

9. The wheel carrier assembly according to claim 1, wherein the air-guiding element is one of plastic or metal.

* * * * *